United States Patent Office 3,173,850
Patented Mar. 16, 1965

3,173,850
METHOD FOR STABILIZING COLOR OF GLASS EXPOSED TO HIGH LEVEL X-RADIATION
Harrison P. Hood, Corning, N.Y., assignor to Corning Glass Works, Corning, N.Y., a corporation of New York
No Drawing. Filed Nov. 10, 1955, Ser. No. 546,287
2 Claims. (Cl. 204—157)

This invention relates to roentgenometers and particularly to roentgenometers capable of indicating a high level of energy and of measuring the dosage or amount of bactericidal radiations received by meats and other foodstuffs and the like while being sterilized thereby. The term "bactericidal radiations" includes radioactive emanations, X-rays shorter than about 4 A. and electrons having an energy equivalent to the radiations shorter than 4 A.

To be suitable for such purpose a roentgenometer must be sensitive to an energy level of at least 100,000 roentgens. At this level personal dosimeters or roentgenometers, which are sensitive to lower energy levels, are ineffective because their maximum reading is attained with less than sterilizing dosages.

Accordingly, prior high level roentgenometers are of the chemical type, such as the well known ceric-cerous dosimeter in which ceric ions in solution are progressively reduced by the radiations, the amount of reduction and the corresponding dosage being determined colorimetrically. Such indicating means is complex and cumbersome and a simple direct-reading dosimeter, in which the effect of the radiations is visible and distinctive in character, is very desirable.

It has been proposed to utilize the well-known fluorescent-reading personal dosimeter comprising a potash-barium-phosphate glass containing silver phosphate, which becomes fluorescent on exposure to a relatively low energy level but which at higher levels becomes colored with a brownish discoloration, a solarization phenomenon that is characteristic of most glasses. Such discoloration is not sufficiently distinctive and lasting in character for the present purpose, since it is not permanent but may be removed by heating the irradiated glass briefly at 150° C. and will even fade at room temperature over a period of time.

It is an object of this invention to provide a roentgenometer which, when exposed to sterilizing dosages of bactericidal radiations, will, as an effect of such irradiation, acquire a distinctive color which does not fade and is substantially unaffected by heat up to 300° C. or more.

According to the invention such as roentgenometer comprises a substantially lead-free glass containing by weight 0.1% to 0.8% of magnanese oxides computed as $MnO_2$ and 1% to 5% of antimony oxides computed as $Sb_2O_3$ whereby, when said glass has received a dosage of said radiations sufficient to destroy all bacteria in the vicinity of the glass, the glass will become distinctively colored with a substantially permanent purple color as an indication of such dosage.

Practically any silicate glass containing the stated amounts of manganese oxides computed as $MnO_2$ and antimony oxides computed as $Sb_2O_3$, particularly the well known soda-lime-silicate glasses and borosilicate glasses, may be used for producing the present roentgenometer. Such a glass may be more specifically defined as a non-lead glass essentially containing $SiO_2$, at least one alkali metal oxide selected from the group consisting of $Na_2O$, $K_2O$, and $Li_2O$, one or more of the oxides $B_2O_3$, $Al_2O_3$, BeO, MgO, CaO, ZnO, SrO, CdO, and BaO, into the composition of which are introduced, in accordance with the invention, 1% to 5% by weight of antimony oxides computed as $Sb_2O_3$, and a potential coloring oxide consisting essentially of 0.1% to 0.8% by weight of manganese oxides computed as $MnO_2$.

The following composition in weight percent as calculated from its batch is an example of such a glass:

| | |
|---|---|
| $SiO_2$ | 66 |
| $Na_2O$ | 15 |
| $K_2O$ | 2.5 |
| $Al_2O_3$ | 2 |
| BaO | 2 |
| CaO | 5.4 |
| MgO | 4 |
| $B_2O_3$ | 2 |
| $MnO_2$ | 0.15 |
| $Sb_2O_3$ | 1 |

The choice of compounds used for the introduction of the manganese and antimony oxides into the glass is immaterial but it is convenient and preferable to utilize the commonly available $MnO_2$ and $Sb_2O_3$. During the melting of the glass the $MnO_2$ is partially reduced by the $Sb_2O_3$ to MnO, which does not color the glass, and $Sb_2O_5$ is formed. As is well known, neither of the oxides of antimony produces color in glass. Lead oxide, which causes absorption of the sterilizing radiations, should not be present.

One skilled in the art will readily understand that the addition of manganese and antimony oxides to any conventional glass composition in the ranges contemplated for carrying out the present invention will not change or complicate the melting process which would be used for melting the glasses in the absence of these oxides. Accordingly, it would be obvious that any and all of the glass compositions contemplated within the scope of this invention may be readily melted, cooled, and formed by one skilled in the art using only conventional techniques such as may be found discussed in detail in The Manufacture of Optical Glass and of Optical Systems, Ordinance Department Document No. 2037, Government Printing Office, May 1921 (esp. pp. 117–119); Glass Engineering Handbook, Shand, (esp. Chapter 7, Raw Materials and Melting); and Glass, The Miracle Maker, Phillips, Third Printing, 1931 (esp. pp. 152–154).

When such glass is irradiated with sterilizing dosages of bactericidal radiations, each quantum of light theoretically displaces from a manganese atom in the glass an electron which is trapped by a pentavalent antimony atom whereby the antimony is reduced to the trivalent state and the manganese is oxidized to a colored state, which causes a purple coloration in the glass. The antimony oxide in the glass, which promoted the initial reduction of manganese to the colorless state during melting, thereby making the glass sensitive to the coloring effect of the sterilizing radiations, may also aid in maintaining such coloration.

The above-mentioned amounts of manganese oxides computed as $MnO_2$ and antimony oxides computed as $Sb_2O_3$ are critical and amounts outside these ranges are ineffective for the present purpose for the following reasons: A deficiency of manganese oxides computed as $MnO_2$ in the glass results in failure of the purple coloration of the glass to develop during its irradiation and also in the possible development of the above-mentioned unstable brown discoloration, while an excess of manganese oxides computed as $MnO_2$ results in an initially purple colored glass. A deficiency of antimony oxides computed as $Sb_2O_3$ also results in the unstable brown instead of purple coloration and an excess of antimony oxides computed as $Sb_2O_3$ beyond 5% produces no further beneficial effect although otherwise generally harmless.

The unstable brownish discoloration, which develops in most glasses upon being irradiated with bactericidal radiations and the origin of which is not clearly understood, may modify and somewhat dull the purple coloration if the $MnO_2$ content of the glass is relatively low. I have found that $MnO_2$, when present in substantial amounts within the stated range, tends to prevent such discoloration and that the introduction into the glass of 1% to 1.5% by weight of $CeO_2$ will also prevent it when the $MnO_2$ content is not high enough to do so. Less than this amount of $CeO_2$ is ineffective and more than this amount produces no further beneficial effect but tends to cause a yellowish or brown coloration.

It might be expected that the oxides of arsenic would function the same as the oxides of antimony in the glass of the present roentgenometers, since the properties of arsenic and its effect in glass are generally similar to those of antimony. I have found, however, that arsenic does not function as satisfactorily as antimony for the present purpose and is not a desirable substitute for it. The presence of arsenic oxide in the glass tends to increase the normal tendency for discoloration or browning by the irradiation used for sterilization.

The present roentgenometer, being composed primarily of glass, may take any desired form advantageous for its use. In its simplest form it comprises a small polished rectangular piece of the glass which is placed adjacent the article or product being sterilized so as to be simultaneously exposed therewith.

What is claimed is:

1. The method of creating purple coloration which does not fade and is substantially unaffected by heat up to 300° C. in a non-lead glass consisting essentially of $SiO_2$, at least one alkali metal oxide selected from the class consisting of $K_2O$, $Na_2O$, and $Li_2O$, at least one bivalent metal oxide selected from the class consisting of BeO, MgO, CaO, ZnO, SrO, CdO, and BaO, at least one trivalent metal oxide selected from the class consisting of $Al_2O_3$ and $B_2O_3$, 0.1% to 0.8% of manganese oxides computed as $MnO_2$ and being present in a colorless state, and 1% to 5% of antimony oxides computed as $Sb_2O_3$ and being present, at least in part, as $Sb_2O_5$, which comprises subjecting said glass to bactericidal radiations consisting essentially of X-radiation shorter than about 4 A. and at an energy level of at least about 100,000 roentgens.

2. The method of claim 1 in which the glass also contains 1% to 1.5% $CeO_2$.

References Cited in the file of this patent

UNITED STATES PATENTS

| | | |
|---|---|---|
| 2,539,316 | Navarre | Jan. 23, 1951 |
| 2,655,452 | Barnes | Oct. 13, 1953 |
| 2,676,109 | Barnes | Apr. 20, 1954 |
| 2,752,506 | Fitzgerald et al. | June 26, 1956 |

OTHER REFERENCES

Glastechnische Tabellen, page 690, line 5, by Dr. W. Eitel et al. (Germany, 1932).